United States Patent
Strothmann

(10) Patent No.: US 8,316,409 B2
(45) Date of Patent: Nov. 20, 2012

(54) SIMULTANEOUS ACCESS TO MEDIA IN A MEDIA DELIVERY SYSTEM

(76) Inventor: James Strothmann, Alpharetta, GA (US)

( * ) Notice: Subject to any disclaimer, the term of this patent is extended or adjusted under 35 U.S.C. 154(b) by 1382 days.

(21) Appl. No.: 11/870,642

(22) Filed: Oct. 11, 2007

(65) Prior Publication Data

US 2009/0100489 A1 Apr. 16, 2009

(51) Int. Cl.
*H04N 7/173* (2006.01)
(52) U.S. Cl. .......................... 725/131; 725/105; 725/151
(58) Field of Classification Search .......................... None
See application file for complete search history.

(56) References Cited

U.S. PATENT DOCUMENTS

| | | | | |
|---|---|---|---|---|
| 5,905,522 | A * | 5/1999 | Lawler | 725/131 |
| 7,089,577 | B1 * | 8/2006 | Rakib et al. | 725/87 |
| 2002/0194251 | A1 * | 12/2002 | Richter et al. | 709/105 |
| 2004/0160971 | A1 * | 8/2004 | Krause et al. | 370/412 |
| 2005/0053090 | A1 * | 3/2005 | Harada et al. | 370/464 |
| 2005/0101246 | A1 * | 5/2005 | Choi et al. | 455/3.01 |
| 2008/0192820 | A1 * | 8/2008 | Brooks et al. | 375/240.02 |
| 2009/0025027 | A1 * | 1/2009 | Craner | 725/32 |

OTHER PUBLICATIONS

"An Open Architecture for Switched Digital Services in HFC Networks," by Luis Roviar and Lorenzo Bombelli, presented at SCTE 2006 Conference on Emerging Technologies.
"Beyond Bandwidth Management: Business Benefits of Switched Digital Video in Cable," by Lorenzo Bombelli, presented at NCTA—The National Show 2006.
Chinese First Office Action dated Aug. 3, 2012 cited in Application No. 200880111216.8, 6 pgs.

* cited by examiner

*Primary Examiner* — Chenea Smith
(74) *Attorney, Agent, or Firm* — Merchant & Gould

(57) ABSTRACT

An embodiment of a cable television system includes a media content source configured to transmit media content to a plurality of home communication terminals (HCTs) over a plurality of physical channels over a shared communication medium. Each physical channel carries the media content on a plurality of logical channels. The system further includes a media allocation server configured to receive requests from the plurality of HCTs, each of the requests from a respective HCT designating desired media content to be simultaneously received at the respective HCT and allocating at least a portion of the desired media content among a plurality of physical channels on respective logical channels.

20 Claims, 8 Drawing Sheets

SIMULTANEOUS ACCESS TO MEDIA IN A MEDIA DELIVERY SYSTEM

BACKGROUND

1. Technical Field

The present disclosure generally relates to media delivery systems, and more particularly, to delivering media to a home communication terminal.

2. Description of the Related Art

The cable version of Switched Digital Video (SDV) is designed to operate over existing Hybrid Fiber/Coax infrastructures to enable delivery of switched video services on the existing installed base of set tops, also referred to herein as home communication terminals (HCTs). Such HCTs can, for example, decode Moving Pictures Expert Group (MPEG) media streams.

The HCTs are in communication with a cable head end system. A cable head end system implements an SDV by allocating a number of logical channels to a number of physical channels that are provided by quadrature amplitude modulation (QAM) modulators. Each of the physical channels can, for example, correspond to a different radio frequency that carries the logical channels. This radio frequency is used by a tuner in an HCT in order to tune to, and receive, the logical channels carried on the physical channel. The logical channels can, for example, carry media content (or media programming) such as broadcast media streams (i.e. video, audio, text, etc.) or video on demand (VoD), among other types of media streams. In many cable networks, media content is transmitted on the logical channels using MPEG (e.g., MPEG-2, MPEG-4, etc.) audio/video compression. The number of logical channels carried on a physical channel is dependent upon the amount of bandwidth allocated to the channel and the allocated bitrate of each logical channel.

Once various content has been allocated by the cable head end system this allocation information is transmitted to the HCTs to provide a mapping of each of the logical channels to the physical channels. Accordingly, when the HCT is instructed to decode a particular logical channel, the HCT consults this mapping to determine which physical channel the requested logical channel is being carried upon. The HCT can then tune to the physical channel and filter the particular logical channel by, for example, its unique program identifier (PID), thereby extracting the desired content from other content received on any other logical channels.

Because physical channels are limited by the total amount of bandwidth provided by a cable operator, the cable head end typically only allocates logical channels to a particular physical channel if the logical channel is in use, or is likely to be used soon, by a particular HCT. In the event that a requested logical channel is not currently being provided on a particular physical channel, the HCT can request that the particular logical channel be provided. In such an instance, the cable head end can allocate the logical channel to a selected physical channel and notify the HCT which physical channel and logical channel the media content is being provided on. The HCT can then tune to the physical channel and receive the desired media content.

Such an SDV set up is particularly advantageous in providing a large variety of potential media content to users without the need for broadcasting every single physical channel to every HCT at the same time. That is, even though a particular cable system may only be able to physically provide 30% of the total available content to a particular neighborhood, it is common for only a small subset of available logical channels to be used by the HCTs in a particular service group at any one time. Thus a Multiple System Operator is able to provide a wide variety of content choices for their subscribers without the need for broadcasting every channel simultaneously.

Although the amount of simultaneously offered media content is on the rise, it is becoming more and more difficult to actually view this content. For example, in conventional systems, a user is not able to access more than one logical channel at a time without providing an equal number of tuners and associated infrastructure in the HCT in order to receive the content. Thus, even though an HCT may include picture-in-picture capabilities, this feature cannot be used to simultaneously view content without multiple tuners. Likewise, even though an HCT may include digital video recorder (DVR) functionality, the HCT cannot record more than a single content instance at a time or view a different content instance from the content instance being recorded without multiple tuners.

Therefore, what is needed are systems and methods that can potentially address one or more of the aforementioned deficiencies, among others.

BRIEF DESCRIPTION OF THE DRAWINGS

The components in the drawings are not necessarily to scale relative to each other. Like reference numerals designate corresponding parts throughout the several views.

DETAILED DESCRIPTION

Embodiments of a cable system are described herein that can, for example, provide simultaneous access to content in a media access system, such as a cable television system. According to some embodiments, HCTs in the system are configured to receive multiple logical channels on a tuned physical channel. For example, a physical channel can comprise an allocated radio frequency (RF) band, while the logical channels comprise digital streams of information that can be uniquely identified by time slots or by a program identifier (PID), among other possibilities. Thus, if desired media content is provided simultaneously within the same tuned physical channel, all such media content is capable of being received simultaneously.

Thus, according to some embodiments, a home communication terminal (HCT) is configured to generate requests for desired media content to be provided simultaneously at the HCT from a media content source. The requests are delivered to a media allocation server which, in response to the request, allocates the requested media content to be carried on a number of physical channels via respective logical channels. This allocation can consider the requests of other HCTs served by the media content source in determining on which physical channel each instance of media content is delivered (e.g. through its respective logical channel). Although this allocation can be performed in a number of ways, according to some embodiments, the media allocation server performs the allocation to maximize the number of fulfilled requests.

Once the allocations are made, the HCTs are notified of a mapping of logical channels to physical channels such that they can receive as much of the requested media content as made possible by the allocation. With a single tuner, the HCT can tune to a respective physical channel that is carrying more than one of the requested media content instances on a plurality of logical channels at the same time. The logical channels that carry the requested media content are filtered from any other logical channels received on the tuned physical channel. The media content carried by the filtered logical channels can be provided to respective usage instances. For example, a usage instance could constitute viewing in the main portion of a display, viewing in a picture-in-picture portion of a display, and/or recording to a memory or storage device, among other possibilities.

Figure 1:
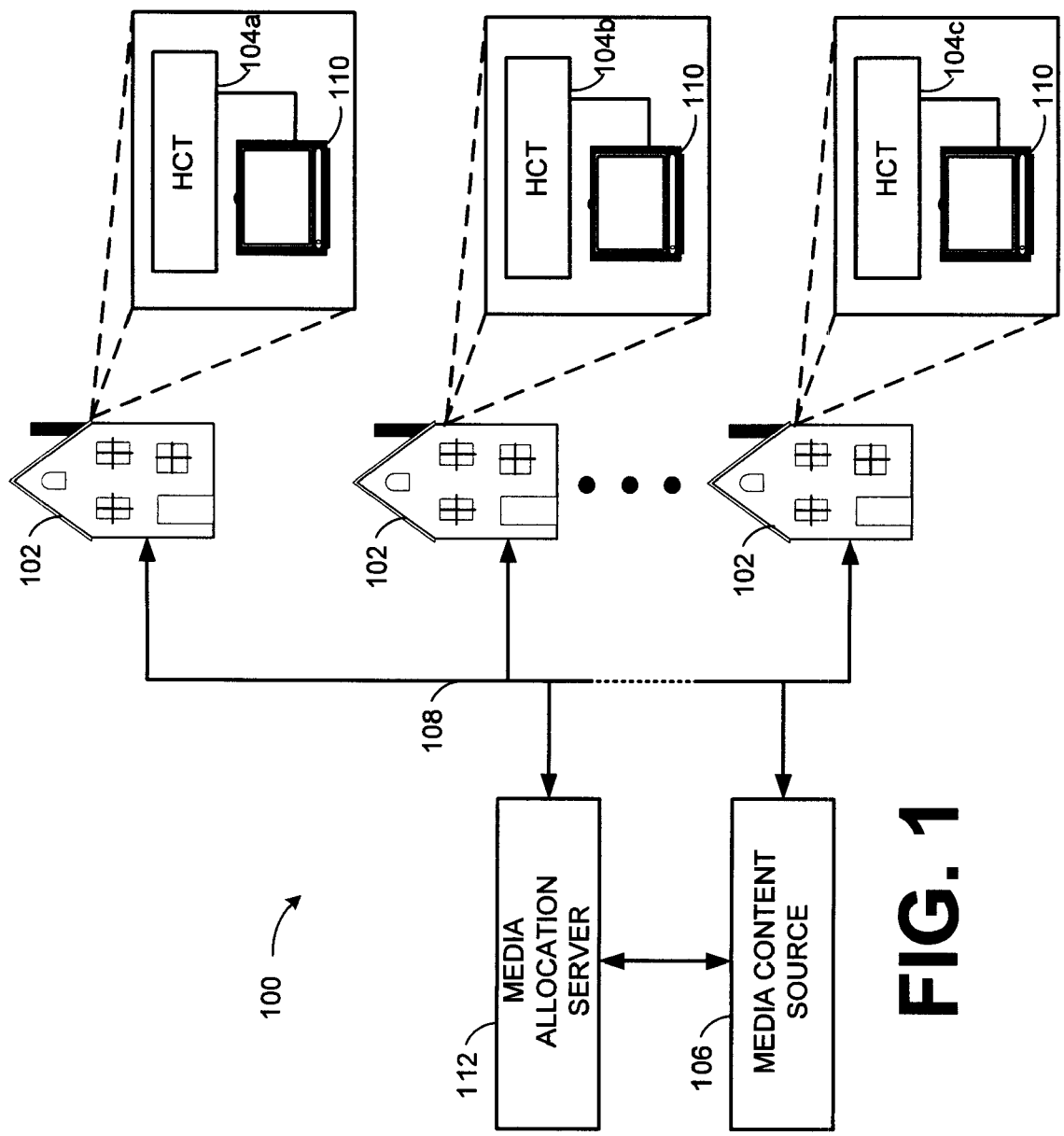
FIG. 1 is a simplified block diagram depicting an embodiment of a media access system, such as a cable television system, in accordance with selected embodiments of the present disclosure

FIG. 1 depicts a simplified block diagram of an embodiment of a cable television system 100 in accordance with selected embodiments of the present disclosure. For example cable television system 100 can be used for providing media content and/or other data to one of a plurality of home communication terminals (HCTs) 104a-104c located within respective user premises 102. The HCTs 104a-104c may, for example, form part of, be associated with, or be integrated in one or more of a cable-television set-top box, a television, portable device, digital video recorder (DVR), personal video recorder (PVR), a personal digital recorder (PDR), and/or a personal computer, laptop computer, or personal digital assistant (PDA), among others. The HCTs 104a-104c are capable of receiving and, possibly, decoding the media content for playback on playback device 110. Playback device could be a television, computer monitor, or other display device. Playback device 110 can, for example, receive and emit signals from HCTs 104a-104c that represent the recorded and/or unrecorded media content. For example, playback device 110 can emit, among others, recorded audio and/or video signals. According to some embodiments, playback device 110 also displays any windows associated with a graphical user interface generated by HCTs 104a-104c.

Media content could comprise, for example, audio, video, images, text, teletext, among others. According to some embodiments, media content, as referred to herein, may also comprise media programs and/or media programming. Some examples of media programming used herein include, but are not be intended to be limited to, television programs and audio programs. Such television programs and/or audio programs could be scheduled broadcasts or delivered to a user on-demand (e.g. such as provided with a video-on demand (VoD) system). The media content could be unicast to a single user, or could be multi-cast or otherwise broadcast to multiple users.

Embodiments of the present disclosure can be, for example, implemented in a switched digital video (SDV) environment, as described in the background of this disclosure as modified by the embodiments described herein. According to some embodiments, a media content source 106 delivers the media content to a number of the HCTs 104a-104c over a transmission medium 108, which may include one or more of, among others, twisted-pair telephone wire, coaxial cable, optical fiber, hybrid fiber coax (HFC), over-the-air waves, etc.

An instance of media content (or media programming, etc.) could be, for example, a television show (e.g. an episode of Smallville) or other segment of recorded media content. The instance of media content can be transmitted across transmission medium 108 on one of a number of physical channels that carries a plurality of logical channels. For example, the physical channel may be a radio frequency (RF channel), while the logical channels represent a number of data streams identified by unique program identifiers (PIDs). Generally speaking, a logical channel typically carries a number of sequential instances of media content over a period of time, although it could also carry a single instance (e.g. to deliver VoD media).

Media allocation server 112 can be configured to allocate specified logical channels to one or more physical channels provided by media content source 106. Thus, the logical channels are transmitted on their respective physical channel by media content source 106 as specified by media allocation server 112.

The available payload bitrate for typical modulation rates (e.g. QAM-256) used on HFC systems is roughly 38 Mbps. That is, each physical channel can carry approximately 38 Mbps of downstream information, which can be allocated to a number of logical channels. According to one example, a rate of 3.75 Mbps can be used to send video content at resolution and quality equivalent to NTSC broadcast signals. In digital television terminology, this is called standard definition (SD) television resolution or service. Therefore, use of MPEG-2 and QAM modulation enables carriage of ten SD logical channels on one RF (physical) channel (i.e. 10×3.75=37.5 Mbps<38 Mbps). It should be understood that this bitrate could be varied depending on the quality of service desired. Additionally, high-definition (HD) signals, for example, require much higher bandwidth.

In the context of a cable network, present day infrastructure provides capacity up to approximately 750 MHz (with a lesser number of networks being built out to approximately 870 MHz). In United States based cable systems, downstream RF channels, used for transmission, each use a 6 MHz spectral slot in the available bandwidth (i.e., between approximately 54 MHz and 870 MHz). However all HCTs in a particular service group (i.e. those HCTs at user locations that are electrically connected to the same media content source 106) receive their services (e.g., broadcast or VoD service, among others) on the same set of RF channels.

According to some embodiments, media content source 106 and/or media allocation server 112 may be located at a cable head end and/or at a hub located between the head end and the locations 102. Although media allocation server 112 and media content source 106 are depicted as two different entities, the functions of each of the media content source 106 and media allocation server 112 may be performed by a single server or other device. Furthermore, it should be understood that cable system 100 may include more than one media allocation server 112 and/or media content source 106. For example, different media content sources 106 may provide media data for designated service groups of HCTs. However, for the purpose of illustration, cable television system 100 includes a single service group including each of HCTs 104a-104c.

Although embodiments are described within the environment of a cable-television system, it should be understood that other media delivery and/or receiving devices are intended to fall within the scope of the present disclosure. For example, the media content source 106 can be a satellite television provider or even a media server on the Internet. The HCTs 104a-104c can be other remote devices, such as satellite television decoders or computers configured to receive media content. Additionally, although the media content may be described as comprising video and audio content, some embodiments may include only audio or only video. The media content could even comprise text or other forms of media. Further, in some instances, non-media information (e.g. security keys, digital-rights management (DRM) information, program guide information, etc.) may be transmitted along or in association with the media content.

Figure 2:
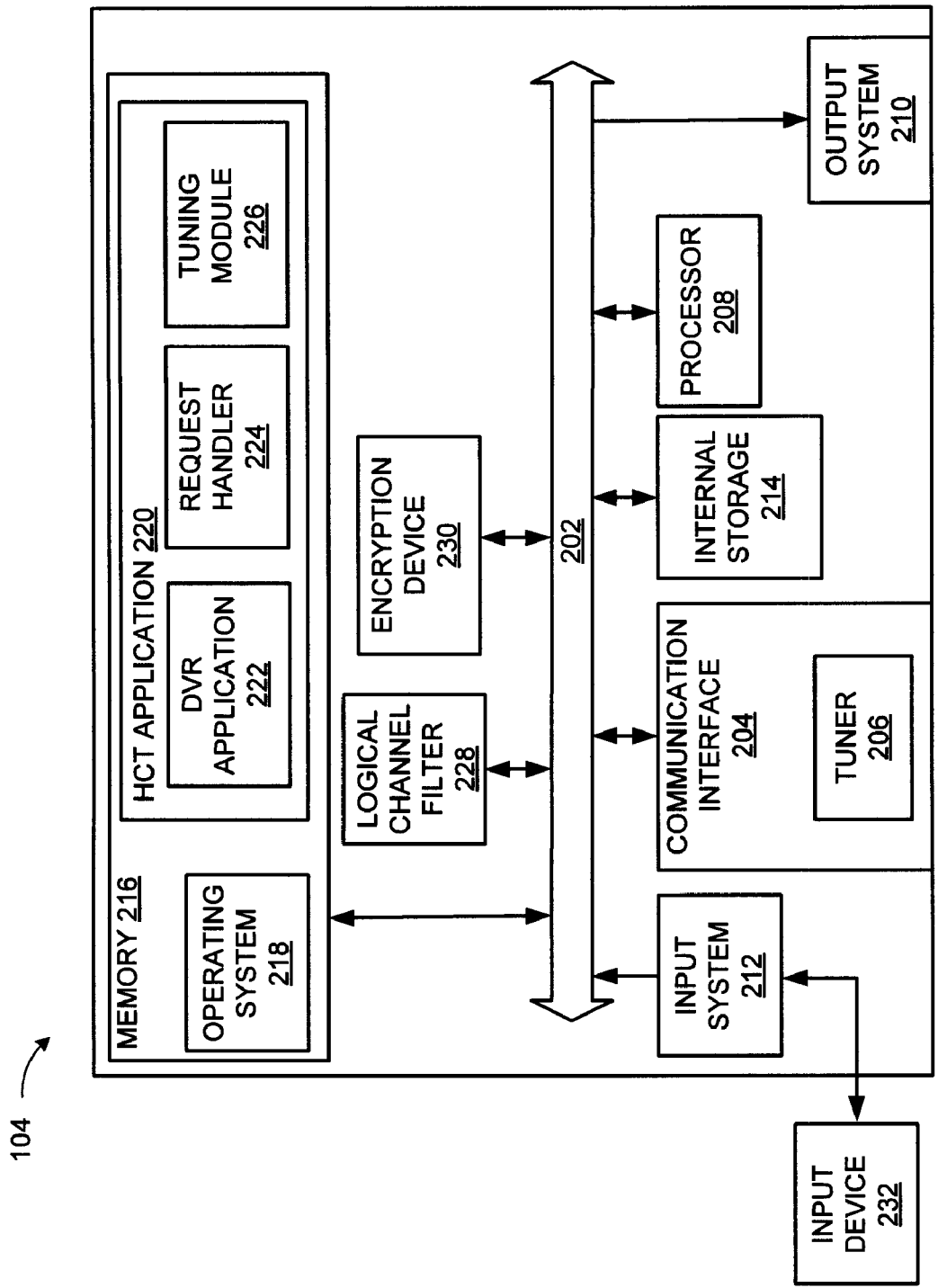
FIG. 2 is a block diagram depicting selected system components of an exemplary embodiment of the home communication terminal (HCT) depicted in FIG. 1.

FIG. 2 is a block diagram depicting selected system components of an exemplary embodiment of one of the HCTs 104a-104c of FIG. 1. FIG. 2 depicts several components commonly communicating through a local bus 202. For example, HCT 104 may include a communications interface 204 for receiving video, audio and other media signals from a media signal source, such as the media content source 106 (FIG. 1). The communication interface 204 may include a tuner 206 for receiving and selecting one or more physical channels (e.g. RF frequencies) over transmission medium 108.

HCT 104 can further include at least one processor 208 for controlling the operations of the HCT 104 and an output system 210 for driving a playback device 110 (FIG. 1). An input system 212 can receive user inputs provided via a wired or wireless input device 232 such as, for example, a hand-held remote control, a transmitter with buttons or keys located on the exterior of the HCT, and/or a keyboard, among others.

Internal storage 214 may comprise a recordable medium and may be a number of devices available for non-volatile data storage, such as a hard disk drive (HDD), optical drive, or flash memory, for example. Internal storage 214 may be used for storing data, including media data and non-media data. Media data could represent media content received through communication interface 204. According to some embodiments, it should be understood that media content can be digitally encoded before being stored on recordable medium by the HCT itself or by mechanisms external from the HCT, such as the media signal source or a cable set-top box. In some embodiments, internal storage 214 is also used for storing non-media data, such as encryption keys, DRM information, and programming guide information associated with stored media data.

Memory 216, which may include volatile and/or non-volatile memory, can store one or more programmed software applications, herein referred to as applications, which contain instructions that may be executed by processor 208 under the direction of operating system 218. Input data used by an application can be stored in memory 216 and read by processor 208 as needed during the course of the application's execution. This input data may be data stored in memory 216 by a secondary application or other source, either internal or external to HCT 104, or may be data that was created with the application at the time it was generated as a software application program.

User input received during the course of execution of any processes implemented by HCT 104 may be received from input device 232 via input system 212, transmitted through the bus 202, temporarily stored within memory 216, and communicated to processor 208. Data generated by an application can be stored in memory 216 by processor 208 during the course of the application's execution. Availability, location, and amount of data generated by one application for consumption by another application can be communicated by messages through the services of operating system 218.

Under user instruction, HCT application 220 can perform the general tasks of managing the playback of media content. HCT application 220 can also provide a navigation framework for services provided by HCT 104. For example HCT application 220 can register for, and in some case reserve, certain user inputs related to navigational keys of the input device 232 (or HCT 104) such as channel increment/decrement, last channel, favorite channel, etc. HCT application 220 can also provide users with television (or other programming) related menu options that correspond to HCT or DVR functions such as, for example, providing an interactive program guide, blocking a channel or a group of channels from being displayed in a channel menu, recording particular channels, playback of recorded shows, etc.

HCT application 220 may, for example, include several sub-modules, such as a DVR application 222, a request handler 224, and a tuning module 226, among several others. DVR application 222 can perform the general tasks of recording and/or playback of received media content, among other tasks. As will be explained in more detail below, request handler 224 can be used for generating user requests for media content to be delivered to HCT 104 from the media content source 106 (FIG. 1). According to some embodiments, request handler 224 may also manage the receipt of information that indicates whether the requested media content will or will not be delivered as requested. Such information may also include tuning information including, for example, identification of a physical channel and logical channel. For example, the identification of the physical channel may identify a radio frequency and the identification of the logical channel may be a PID or other unique identifier. According to some embodiments, such information is delivered to HCT 104 using a carousel data feed, which could contain a specific reply to the request, including tuning information for the requested media content, and/or could provide tuning information for all available media content.

A logical channel filter 228, which could be a PID filter, can be used to filter logical channels received on a tuned physical channel. For example, according to some embodiments, a physical channel may carry a number of logical channels, which could be media streams that are uniquely identified from other logical channels on the physical channel by a PID or other identifier. Such an identifier can be placed in a header, for example, and the logical channel filter 228 can then extract one or more desired logical channels.

According to some embodiments, the data for each logical channel could be multiplexed by time division within the physical channel. Thus, the data for each logical channel could be transmitted in a particular recurring timeslot without the need for a unique identifier. According to such an embodiment the logical channel filter 228 can obtain the data corresponding to the desired channels based on the time slot that such data is received. In such embodiments the logical channel filter 228 may be provided with a mapping of the logical channels to respective time slots.

Portions of HCT application 220, operating system 218, and/or an encryption device 230 may also facilitate the encrypting/decrypting of media data and/or other information used in the described systems and methods. For example, encryption device 230 may be used for performing encryption and/or decryption of media content. For example, such an encryption device 230 can decrypt the media content received from the media content source 106 (FIG. 1) or from other HCT 104 components, such as internal storage 214. Encryption device 230 may also encrypt and/or re-encrypt received media content for storage to internal storage 214.

The applications executed by HCT 104, such as HCT Application 220 and its sub-modules, can comprise executable instructions for implementing logical functions. The applications can be embodied in any computer-readable medium for use by or in connection with an instruction execution system. The instruction execution system may be, for example, a computer-based system, a processor-containing system, or any other system capable of executing instructions. In the context of this document, a "computer-readable medium" can be any means that can contain, store, communicate, propagate, or transport the program for use by or in connection with the instruction execution system, apparatus, or device.

The computer-readable medium can be, for example, but is not limited to, an electronic, solid-state, magnetic, optical, electromagnetic, infrared, or semiconductor system, apparatus, device, or propagation medium, either internal to HCT 104 or externally connected to the HCT 104 via one or more communication ports or network interfaces. More specific examples (a non-exhaustive list) of the computer-readable medium would include the following: an electrical connection (electronic) having one or more wires, a portable computer diskette (magnetic), a hard drive storage device (magnetic), a random access memory (RAM) (solid-state device), a read-only memory (ROM) (solid-state device), an erasable programmable read-only memory (EPROM or Flash memory) (multiple devices), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 3:
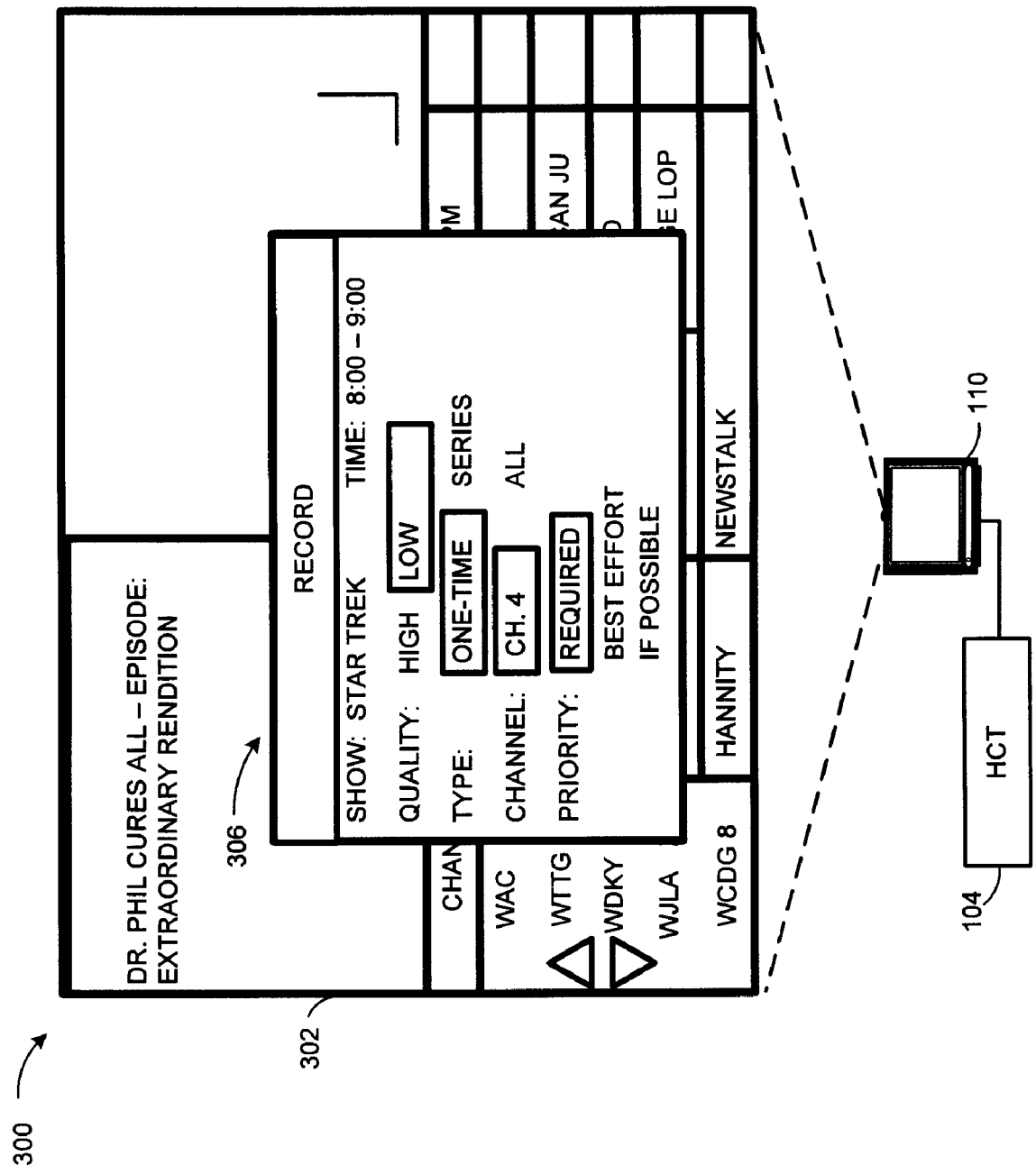
FIG. 3 depicts an exemplary graphical user interface (GUI) generated by the HCT of FIG. 2.

FIG. 3 depicts an exemplary graphical user interface (GUI) 300 generated by HCT 104. HCT application 220 can be used to provide a program guide 302 to a user for the purposes of, for example, selecting various available channels for viewing. According to some embodiments, GUI 300 can facilitate the recording of selected content on one or more logical channels. For example, the record GUI 306 depicts a user selecting to record the instance of media content "Star Trek," which is to be provided from media server 106 (FIG. 1) on channel 4 from 8:00-9:00 at low quality. In this example embodiment, the record GUI 306 includes a priority field with options for "Required" recording, "Best Effort" recording, and "If Possible" recording.

It should be understood that the user's channel 4 could be provided to HCTs 104a-104c on a logical channel over a physical channel. The HCT 104 receives tuning information from media allocation server 112, media content source 106, and/or another remote server which allows the tuner 206 (FIG. 2) and logical channel filter 228 (FIG. 2) to provide the desired channel for viewing and/or recording at the designated time. Specifically, tuning module 226 may use this tuning information to cause tuner 206 to tune to the appropriate physical channel and instruct the logical channel filter 228 to filter the appropriate logical channel(s).

Figure 4:
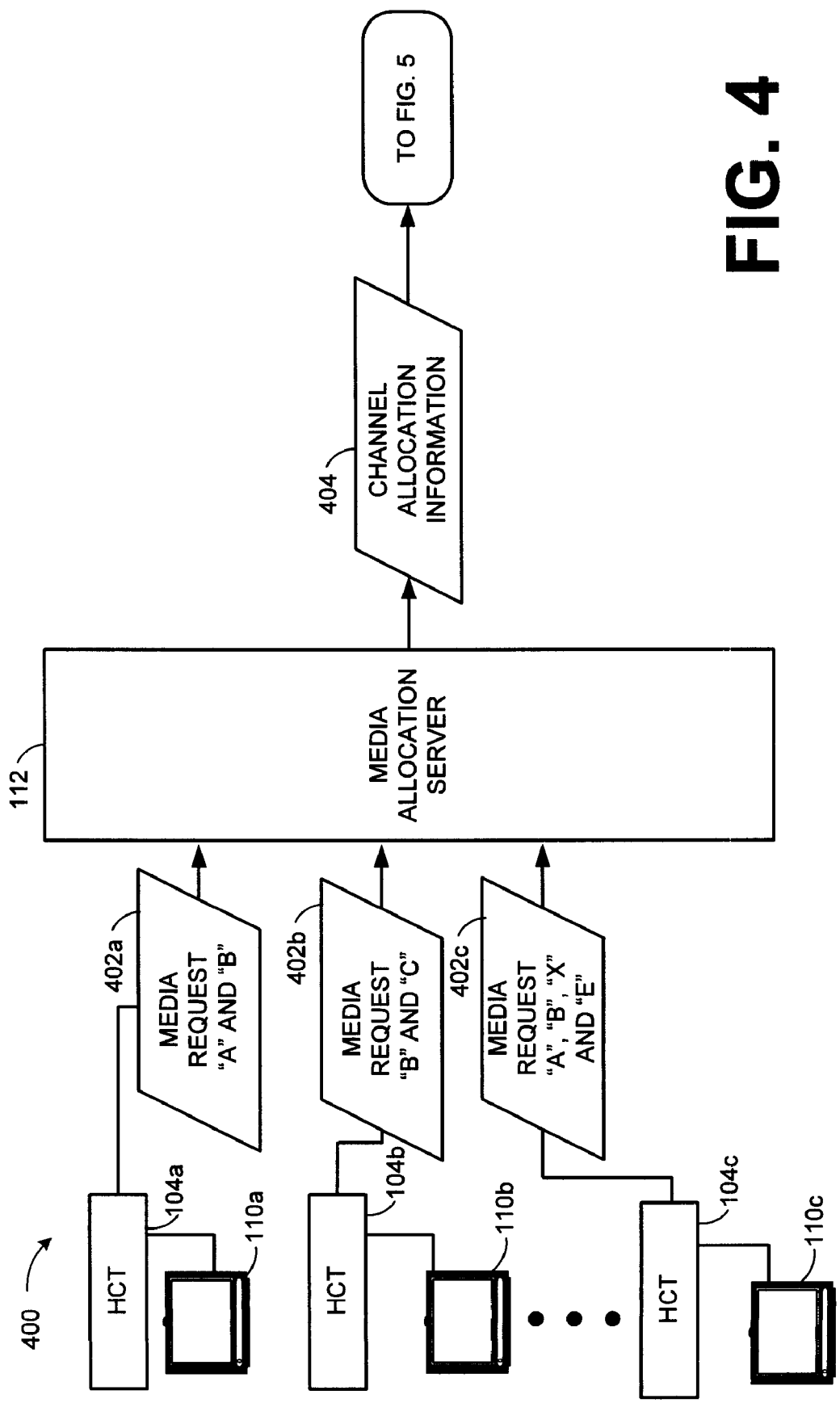
FIG. 4 is a data flow diagram depicting an embodiment of a system and/or method for providing simultaneous access to content in a media access system.

Now that a general overview of the various components of a system for simultaneous access to media content in a media delivery system has been described, FIG. 4 depicts a data flow diagram 400 depicting an embodiment of a system and/or method for providing simultaneous access to media in a media content access system. Using an input device 232 (FIG. 2) to navigate the GUI 300 (FIG. 3), a user of an HCT 104 selects desired media content from the program guide 302. The desired content could correspond to an instance of media content to be presented at the time of the selection or to be recorded later using DVR functionality provided by DVR application 222. HCT application 220 can then effect tuning to the physical and logical channel carrying the content at the desired time. In many cases, it can be desirable to receive more than one media content instance at the same time. For example, a user may wish to view a first desired media content instance in the main portion of the playback device 110 and simultaneously view a second desired media content instance in a picture-in-picture portion of the playback device 110. According to another embodiment, a user may want to watch/listen to a first desired media content instance with playback device 110 while simultaneously recording a second media content instance using the DVR functionality provided by DVR application 222. According to yet another embodiment, a user may want to record a first desired media content instance with playback device 110 while, at the same time, record a second desired media content instance using the DVR functionality provided by DVR application 222.

Although examples provided above include the receipt of two desired media content instances, it may be desirable to receive any number of desired instances simultaneously for various purposes including, among other possible purposes, the recording or viewing of the content. However, conventional media access systems include HCTs that can tune to only a single channel per installed tuner. Thus, because of the considerable expense of the tuners and associated electronics, such conventional HCTs are typically limited in the number of channels that can be received simultaneously. However, using embodiments described herein, the number of simultaneous media content instances capable of being received by an HCT is not limited by the number of tuners installed therein.

According to the example of data flow diagram 400, based on a selection of two or more desired media content instances HCTs 104a-104b each generate a media request, depicted as media requests 402a-402c, respectively. The selections may be made by a user selection (e.g. via GUI 300) or by way of an automated programming selection made by the HCT. The requests 402a-402c identify content that is desired to be received simultaneously at each of HCTs 104a-104c. For example, assume that media content instances "A" thru "Z" are to be made available from media content source 106 simultaneously. Further assume that each of HCTs 104a-104c request a number of simultaneous media content instances that exceeds the number of tuners. For example, according to the example of FIG. 4, each of HCTs 104a-104b request two simultaneous media content instances yet, according to this embodiment, the HCTs 104a-104b include only a single tuner (See FIG. 6). Likewise, HCT 104c requests four simultaneous media content instances, yet HCT 104c includes a dual tuner (See FIG. 7). Specifically, of media content instances "A" thru "Z", the media request from HCT 104a requests media content "A" and media content "B". Similarly, HCT 104b also requests media content "B" and media content "C". Further, HCT 104c requests media content instances "A", "B", "X" and "C". It should be understood that the above is merely an example and that, in reality, there could be hundreds, or more, of available content instances that could be selected for simultaneous delivery to a potential HCT 104. Furthermore, there could be any number of HCTs 104 that are submitting media requests 402.

As depicted in FIG. 4, according to some embodiments, media requests 402a-402c are transmitted to a remote server, such as media allocation server 112. The requests may include identification of the desired media content, which could include any kind of identification that can be used to determine the requested content. The request may also indicate a recording priority for each content instance. That is, by indicating such priority, higher priority media content may be more likely to be recorded. Indeed, one desired media content instance can be guaranteed for every tuner 206 (FIG. 3) in an HCT 104. Every desired content instance exceeding the number of tuners can not be guaranteed without a corresponding guarantee from the cable head end. The media request 402 could also include an indication of the number of physical channels that the HCT 104 can tune to in order to determine which of the requests from a particular HCT can only be satisfied through proper allocation of logical channels by the media allocation server. Thus, the media request 402 may indicate the number of tuners, or other equipment, installed in the particular HCT that allows it to tune to a particular physical channel at the same time.

The requests are delivered to the media allocation server 112 which allocates the requested media content to be carried on one or more physical channels via a respective logical channel. As mentioned previously, the physical channel can comprise an allocated radio frequency (RF) band, while the logical channels comprise digital streams of information that can be uniquely identified by time slots or by a program identifier (PID), among other possibilities.

Media allocation server 112 can use any of a number of possible allocation methods to determine which logical channels are assigned to the various physical channels. Such considerations are made with the understanding that, according to embodiments of the present disclosure, each HCT 104a-104c can only tune to a single physical channel per tuner and associated infrastructure and that each HCT 104a-104c can tune to any number of logical channels carried on each of the tuned physical channels.

Thus, according to some embodiments, media allocation server 112 could use an allocation scheme that, based on the information supplied in the received media requests 402a-402b, maximizes the number of fulfilled requests. According to some embodiments, media allocation server 112 could use an allocation scheme that prioritizes the requests based on time of receipt (e.g. first-come, first-served). According to yet more embodiments, media allocation server 112 could use an allocation scheme that prioritizes the requests based on a subscription level associated with an HCT. For example, a user could pay an increased subscription fee to have a greater chance of having more media requests fulfilled. Similarly, media allocation server 112 could use an allocation scheme that ranks media requests based on compensation. For example, the compensation could be a fixed payment amount or a bid amount, for fulfilling a particular request. The users with the highest payment amounts or bids are then prioritized over those with lower bids.

According to such allocation embodiments, the media request 402 could also include: an identification of the HCT 104, which could be used to determine whether the HCT 104 is entitled to any special programming priorities over other HCTs; a bid or compensation amount for the media request; and/or a date/time stamp. It should be understood that these are merely examples and that there may be a wide variety of ways that media allocation server 112 can allocate the media content among the logical and physical channels.

Figure 5:
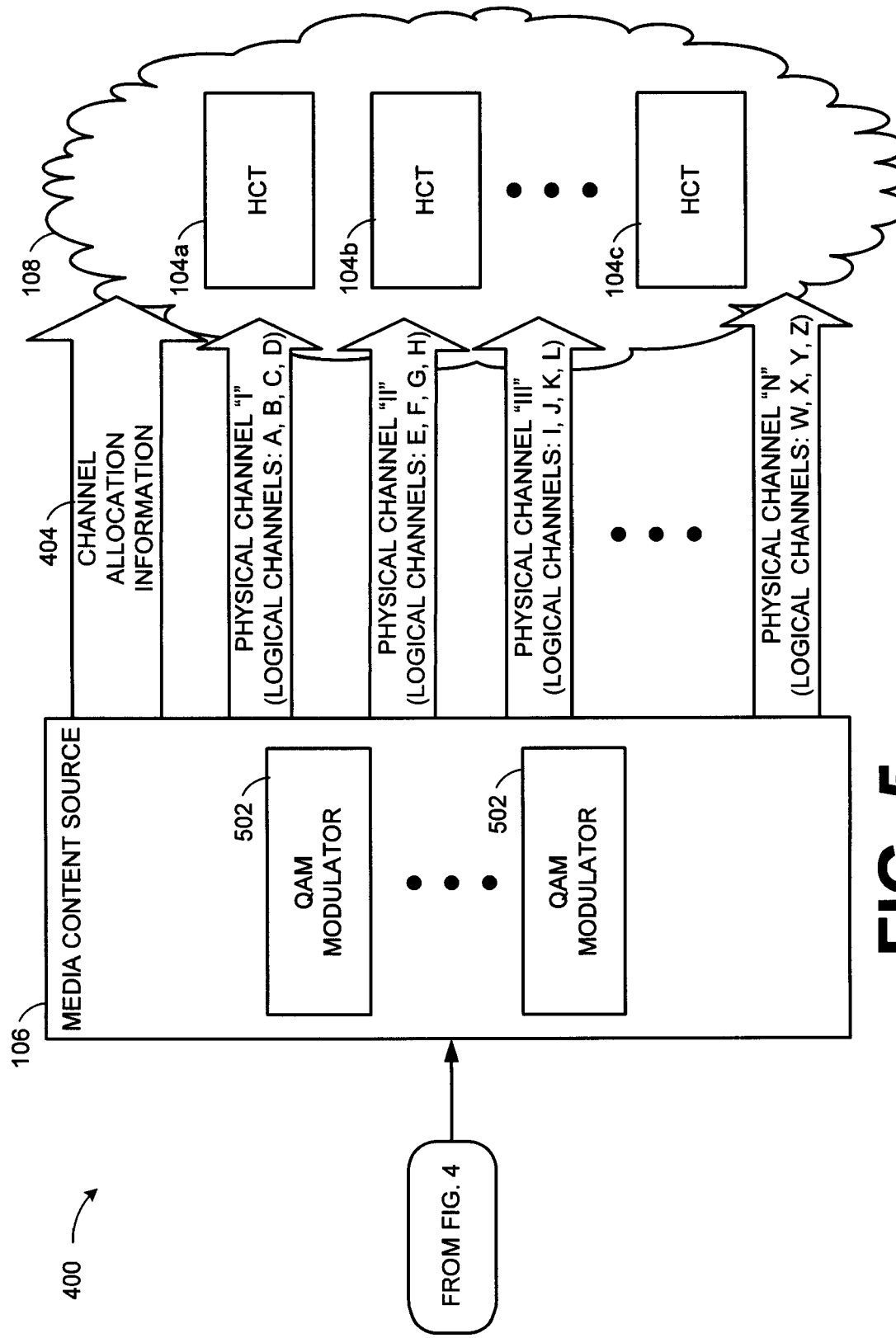
FIG. 5 is a continuation of the data flow diagram of FIG. 4.

Regardless of the allocation methods used, looking to both FIGS. 4 and 5, once the logical channels are allocated to physical channels, channel allocation information 404 is compiled and sent to media content source 106. Channel allocation information 404 provides media content source 106 with a mapping of which logical channels are to be allocated to specified physical channels. Media content source 106 may include a number of QAM modulators 502. QAM modulators 502 receive media content from various feeds, which could include scheduled content as well as VoD content. The QAM modulators 502 serve to modulate the media content into the logical channels within respective physical channels according to the channel allocation information 404.

For the purposes of describing the embodiments herein, it is assumed that allocated media content is carried on a logical channel with the same identifier. For example, media content instances "A", "B", "C", and "D" are carried on logical channels "A", "B", "C", and "D." Furthermore, as depicted in FIG. 5, the QAM modulators 502 of media content source 106 has modulated logical channels "A", "B", "C", and "D" on physical channel "I"; logical channels "E", "F", "G", and "H" on physical channel "II"; logical channels "I", "J", "K", and "L" on physical channel "III"; and logical channels "W", "X", "Y", and "Z" on physical channel "IV". Such physical and logical channels are transmitted on transmission medium 108, which is depicted here as a cloud to emphasize that any of the HCTs 104a-104c could potentially tune to the physical channels "I"-"IV" to receive any of the logical channels carried thereon.

Furthermore, channel allocation information 404 can be transmitted to the HCTs in, for example, a data carousel fashion. Channel allocation information 404 may be in a similar form as provided to media content source 106 or could be delivered in a specialized format for receipt by HCTs 104a. For example, the channel allocation information 404 may include more, less, or different information than provided by media content source 106. However, it still provides HCTs 104a-104c with appropriate information for tuning to the appropriate physical channel(s) and filtering the desired logical channels to obtain the desired media content.

Figure 6:
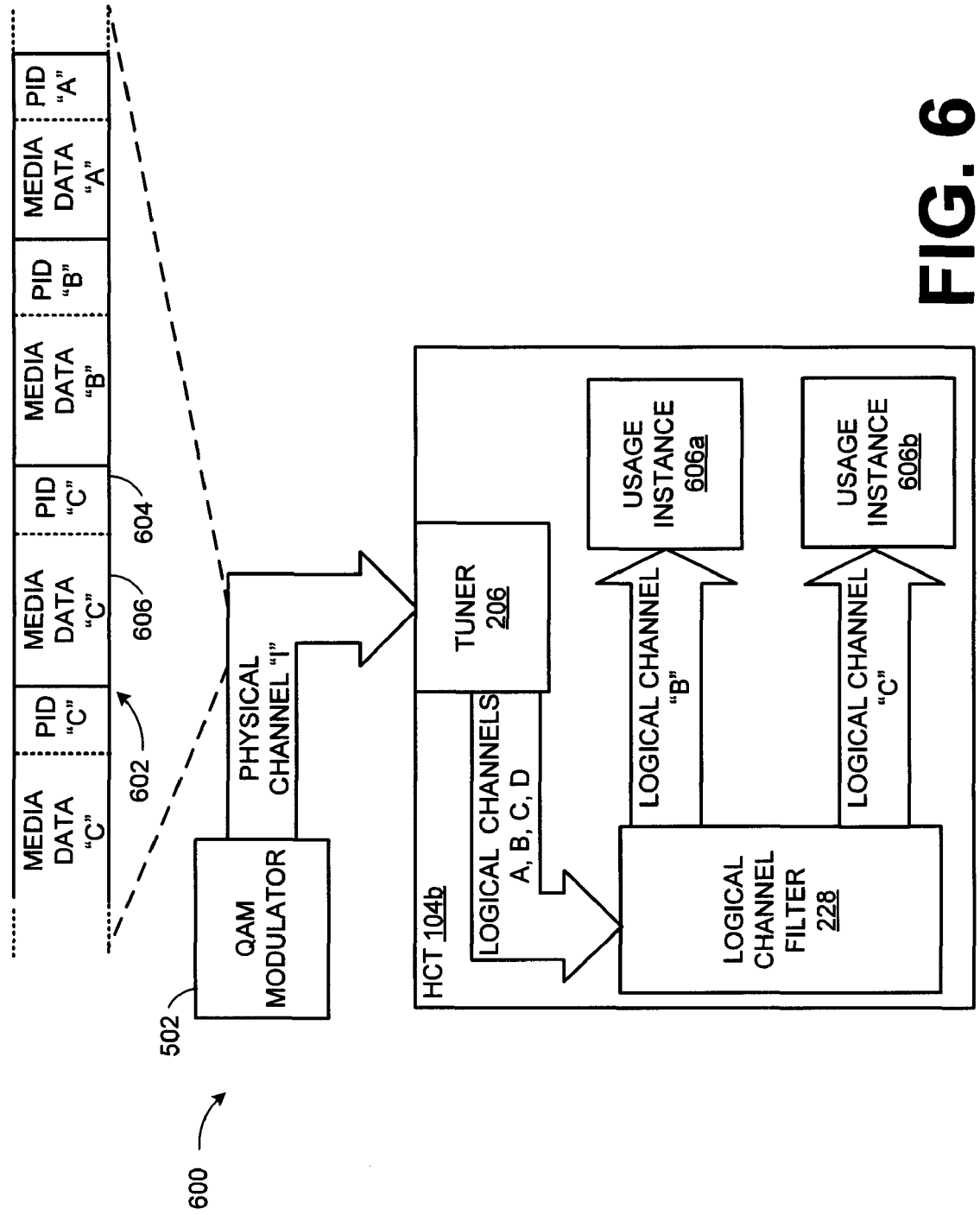
FIG. 6 is a data flow diagram depicting an exemplary embodiment of a portion of the data flow diagram of FIG. 5, in more detail.

FIG. 6 is a data flow diagram depicting an exemplary embodiment 600 of a portion of the data flow diagram 400 of FIG. 5 in more detail. Here, HCT 104b includes a single tuner 206, but requested to simultaneously receive the media content on logical channels "B" and "C." (See the media request 402b in FIG. 4). Before sending the media request 402b (FIG. 4), HCT 104b is guaranteed to be able to tune to either one of logical channels "B" or "C", regardless of which physical channels to which they are allocated. However, according to embodiments of the present disclosure, both logical channels "B" and "C" can be received provided that media allocation server 112 has allocated both media content instances to the same physical channel. Here, logical channels "B" and "C" are allocated to physical channel "I." Thus, HCT 104b is able to receive both logical channels simultaneously.

Specifically, QAM modulator 502 provides physical channel "I", which comprises the exemplary modulated logical channels 602, comprising logical channels A, B, C, and D. Modulated logical channel stream 602 can be transmitted on physical channel "I" by encapsulating each logical channel in packets having a header 604 and a media data portion 606. The header 604 can include, among other information, a unique identifier such as a PID. According to some embodiments, the media data 606 can be time division multiplexed and, thus, transmitted in defined time slots in modulated logical channels 602. The header may not be necessary in such an embodiment.

Tuning module 226 (FIG. 2) instructs tuner 206 to tune to physical channel "I", causing logical channels A, B, C, and D to be received by logical channel filter 228. Logical channel filter 228, which could be a PID filter or time division demultiplexer, for example, can be used to filter the requested logical channels to provide a particular usage instance 606a and/or 606b with the desired media content. Each of usage instances 606a or 606b could be, for example, a main display instance, a PiP display instance, or a DVR recording instance, among other possibilities.

Although only a single logical channel filter 228 is depicted (which could be implemented in software or hardware), according to some embodiments, a separate logical channel filter 228 can be used to filter each desired logical channel. Thus, according to such an embodiment, to receive up to N logical channels, N logical channel filters 228 are used. Furthermore, depending on the particular implementation, various decryption modules may be required for decrypting each logical channel.

Accordingly, in summary, with a single tuner 206, HCT 104b can tune to a physical channel and receive any of the media content instances on a plurality of logical channels carried by the physical channel at the same time. The desired logical channels that carry the requested media content are filtered from any other logical channels received on the tuned physical channel and provided to the usage instances 606a and 606b.

Figure 7:
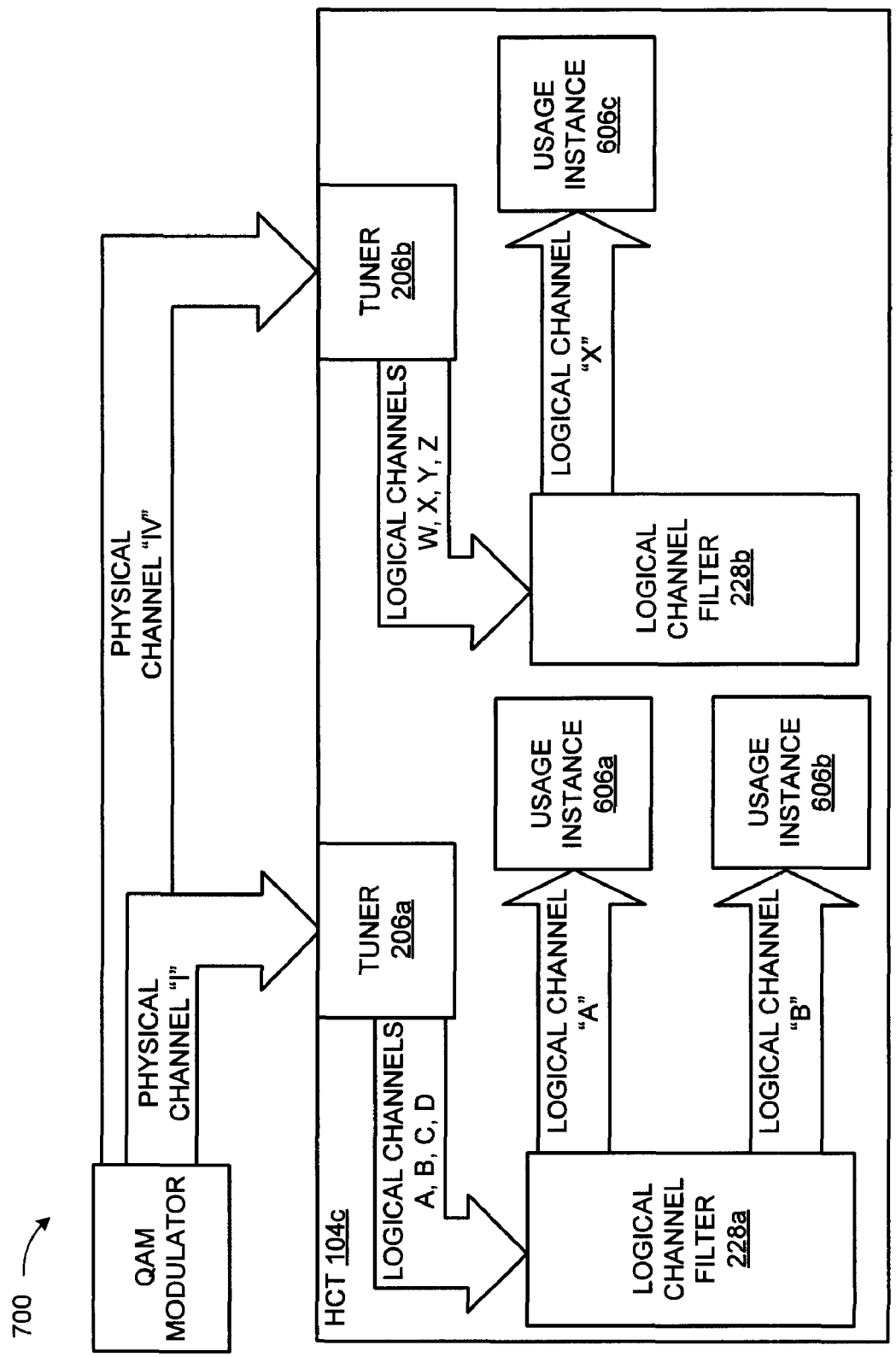
FIG. 7 is a data flow diagram depicting another exemplary embodiment of a portion of the data flow diagram of FIG. 5, in more detail.

FIG. 7 depicts a data flow diagram depicting an another embodiment 700 of a portion of the data flow diagram 400 of FIG. 5 in more detail. Here, HCT 104c includes two tuners 206a and 206b, paired with respective logical channel filters 228a and 228b, allowing desired media content to be received on up to two physical channels. Here, HCT 104c requests the simultaneous receipt of media content on logical channels "A", "B", "E" and "X." (See the media request 402c in FIG. 4). Before sending the media request 402c (FIG. 4), HCT 104c is guaranteed to be able to tune to two of the four logical channels "A", "B", "E" or "X", regardless of which physical channels they are allocated to. However, according to embodiments of the present disclosure, all of logical channels "A", "B", "E" and "X" could potentially be received provided that media allocation server 112 has allocated all four logical channels "A", "B" or "X" to less than two physical channels. Here, logical channels "A" and "B" are allocated to physical channel "I." Thus, HCT 104c is able to receive both of these logical channels simultaneously by tuning to physical channel "I" with tuner 206a and filtering logical channels "A" and "B" as described above to provide usage instances 606a and 606b with the desired content (e.g., media content instances "A" and "B").

However, logical channels "E" and "X" are assigned to two different physical channels, and there is only one remaining tuner 206b. Accordingly, in the case that logical channel "X" is prioritized over channel "E", tuner 206b tunes to physical channel "IV" and filters logical channel "X" with logical channel filter 228b to provide logical channel "X" to usage instance 606c. In this example, all of the requested media content could not be provided to HCT 104c. Had media allocation server 112 allocated both of logical channels "E" and "X" to the same physical channel, HCT 104c could have received all requested media content. However, as illustrated above, media allocation server 112 may not be able to satisfy all media requests 402 in some instances.

Although all media requests 402 may not be satisfied in all cases, the described embodiments allow HCTs to potentially receive more simultaneous media content than with conventional media access systems. Although content cannot be guaranteed in some instances, disappointment by end users can be mitigated though the use of providing "guaranteed" and "non-guaranteed" requests. For example, the number of guaranteed requests can be equivalent to the number of available physical channel tuners on the HCT, while any additional media requests can be considered "non-guaranteed."

Figure 8:
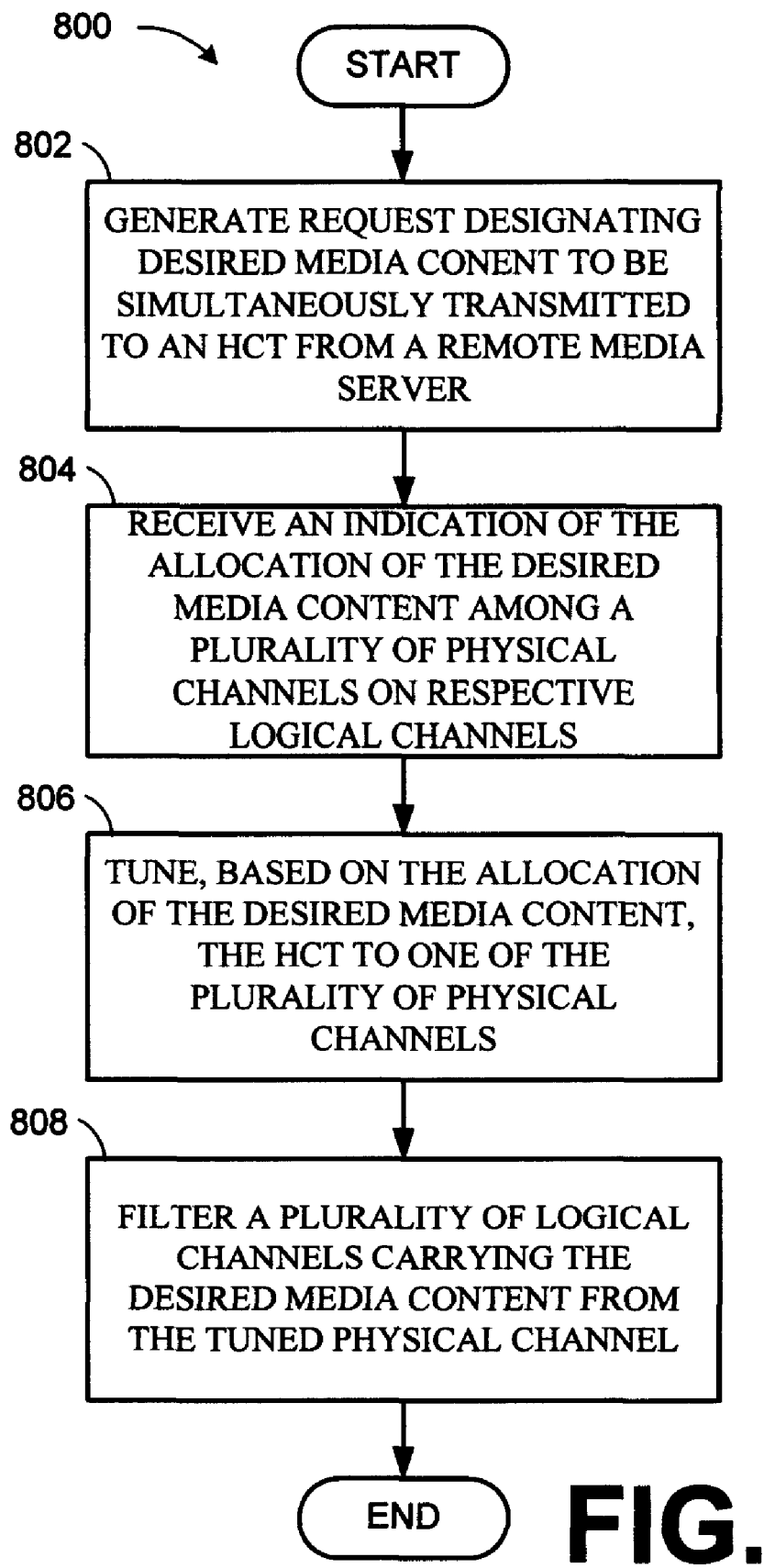
FIG. 8 is a flow chart depicting an exemplary method for providing simultaneous access to media content in a media access system.

FIG. 8 depicts a flow diagram of an exemplary method for providing an HCT with simultaneous access to media content. At block 802, a request is generated that designates desired media content to be simultaneously transmitted to the HCT from a remote media server. At block 804, an indication of the allocation of the desired content among a plurality of physical channels on respective logical channels is received. At block 806, the HCT is tuned to one of the plurality of physical channels based on the allocation of the desired content. At block 808, a plurality of logical channels carrying the desired media content from the tuned physical channel is filtered.

Any process descriptions, steps, or blocks in the flow or data flow diagrams described herein and/or depicted in the attached figures should be understood as potentially representing modules, segments, or portions of code which include one or more executable instructions for implementing specific logical functions or steps in the process. Alternate implementations are included within the scope of the preferred embodiments of the systems and methods described herein in which steps or functions may be deleted, executed out of order from that shown or discussed, including substantially concurrently or in reverse order, depending on the functionality involved, as would be understood by those reasonably skilled in the art.

Conditional language, such as, among others, "can," "could," "might," or "may," unless specifically stated otherwise, or otherwise understood within the context as used, is generally intended to convey that certain embodiments could include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

It should be emphasized that many variations and modifications may be made to the above-described embodiments, the elements of which are to be understood as being among other acceptable examples. All such modifications and variations are intended to be included herein within the scope of this disclosure and protected by the following claims.

At least the following is claimed:

1. A home communication terminal (HCT) comprising:
a processor configured to retrieve and execute instructions from a memory device, the instructions comprising:
logic configured to generate a request designating a plurality of desired media content to be simultaneously transmitted to the HCT from a remote media server, the request comprising an identifier for each of the plurality desired media content, a priority associated with each of the plurality of desired media content, and a number of tuners associated with the HCT;
logic configured to receive an indication of an allocation of the plurality of desired media content among a plurality of physical channels on respective logical channels, wherein the plurality of desired media content are allocated among the plurality of physical channels based on the priority associated with each of the plurality of desired media content; and
logic configured, based on the allocation of the plurality of desired media content, to cause the HCT to tune to at least one of the plurality of physical channels and filter a plurality of the logical channels carrying the plurality of desired media content from the tuned physical channel, wherein if a number of the plurality of physical channels is more than the number of tuners associated with the HCT, logic configured for the HCT to tune to the physical channels having media content with higher priority.

2. The HCT of claim 1, further comprising:
at least one tuner configured to tune to one of the physical channels carrying at least one of the desired media content; and
at least one logical channel filter configured to filter the plurality of logical channels carrying the desired media content from the tuned physical channel.

3. The HCT of claim 2, further comprising providing the filtered desired media content to a usage instance, the usage instance comprising one of viewing the content in the main portion of a display, viewing the content in a picture-in-picture portion of a display, and recording the content to a memory or storage device.

4. The HCT of claim 2, wherein the logical channel filter is a Program Identifier (PID) filter.

5. The HCT of claim 1, further comprising a logical channel filter for each of the logical channels carrying the desired media content.

6. The HCT of claim 1, further comprising logic configured to display a graphical user interface (GUI) to a user, the GUI for receiving user input to generate the requests designating the desired media content.

7. The HCT of claim 1, wherein the indication of allocation further comprises an indication of which of the plurality of desired media content is guaranteed, wherein a number of guaranteed media content is equal to the number of tuners associated with the HCT.

8. A method for providing a home communication terminal (HCT) with simultaneous access to media comprising:
generating a request designating a plurality of desired media content to be simultaneously transmitted to the HCT from a remote media server, the request comprising a program identifier for each of the plurality desired media content, a priority associated with each of the plurality of desired media content, and a number of tuners associated with the HCT;
receiving an indication of an allocation of the plurality of desired media content among a plurality of physical channels on respective logical channels, wherein the plurality of desired media content are allocated among the plurality of physical channels based on the priority associated with each of the plurality of desired media content;
tuning, based on the allocation of the desired media content, the HCT to at least one of the plurality of physical channels, wherein if a number of the plurality of physical channels is more than the number of tuners associated with the HCT, tuning to the at least one physical channels having media content with higher priority; and
filtering a plurality of the logical channels carrying the desired media content from the tuned physical channel.

9. The method of claim 8, wherein filtering the plurality of the logical channels carrying the desired media content from the tuned physical channel comprises filtering the desired media content based on a program identifier (PID).

10. The method of claim 8, wherein receiving an indication of an allocation comprises receiving an indication of an allocation, wherein the plurality of desired media content are allocated among the plurality of physical channels based on the priority associated with each of the plurality of desired media content, and wherein the priority of a desired media content is determined based on whether the HCT is entitled to special programming priority.

11. A cable television system comprising:
a media content source configured to transmit media content to a plurality of home communication terminals (HCTs) on a plurality of physical channels over a shared communication medium, each physical channel carrying a portion of the media content on respective logical channels;
a media allocation server configured to:
receive requests from the plurality of HCTs, each of the requests from a respective HCT of the plurality of HCTs designating a plurality of desired media content to be simultaneously received at the respective HCT, each request comprising a program identifier for each of the plurality desired media content, a priority associated with each of the plurality of desired media content, and a number of tuners associated with the respective HCT, and
allocate at least a portion of the plurality of desired media content among the plurality of physical channels on the plurality of logical channels, wherein at least the portion of the plurality of desired media content is allocated among the plurality of physical channels based on the priority associated with each of the plurality of desired media content; and
wherein the plurality of HCTs are configured to tune, based on the allocation of at least the portion of the desired media content, to at least one of the plurality of physical channels, wherein if a number of the plurality of physical channels is more than the number of tuners associated with the respective HCT, the respective HCT further configured to tune to the at least one physical channel having media content with higher priority.

12. The cable television system of claim 11, wherein the media content source and the media allocation server are the same physical server.

13. The cable television system of claim 11, wherein the media allocation server is further configured to allocate the plurality of desired media content among the plurality of physical channels on the plurality of logical channels to maximize the number of fulfilled requests for desired media content.

14. The cable television system of claim 11, wherein the media allocation server is further configured to allocate the plurality of desired media content among the plurality of physical channels on the plurality of logical channels by prioritizing the fulfillment of the requests from the plurality of HCTs based on a time stamp associated with receipt of each of the requests.

15. The cable television system of claim 11, wherein the media allocation server is further configured to allocate the plurality of desired media content among the plurality of physical channels on the plurality of logical channels by prioritizing the fulfillment of the requests from the plurality of HCTs based on an amount of compensation provided by a user.

16. The cable television system of claim 11, wherein the media allocation server is further configured to allocate the plurality of desired media content among the plurality of physical channels on the plurality of logical channels by prioritizing fulfillment of the requests from the plurality of HCTs based on a subscription level associated with the HCTs, wherein the subscription level associated with the HCTs is received with the requests.

17. The cable television system of claim 11, wherein the media allocation server is further configured to transmit channel allocation information to the media content source, the media allocation information providing a mapping of the plurality of logical channels that are to be allocated among the plurality of physical channels.

18. The cable television system of claim 11, wherein the media content source comprises:

at least one device for modulating the media content into the plurality of logical channels on the plurality of physical channels according to the channel allocation information.

19. The cable television system of claim 11, wherein at least one of the media allocation server and the media content source is configured to provide the channel allocation information to the plurality of HCTs.

20. The cable television system of claim 19, wherein the at least one of the media allocation server and the media content source is configured to provide the channel allocation information to the plurality of HCTs using a data carousel.

* * * * *